(12) United States Patent
Mo et al.

(10) Patent No.: US 9,407,892 B2
(45) Date of Patent: Aug. 2, 2016

(54) METHODS AND APPARATUS FOR KEYWORD-BASED, NON-LINEAR NAVIGATION OF VIDEO STREAMS AND OTHER CONTENT

(75) Inventors: Stanley Mo, Hillsboro, OR (US); Claudio J. Ochoa, Cordoba (AR); Victor Szilagyi, London (GB); Elliot Smith, Northfield (GB)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 13/994,838

(22) PCT Filed: Sep. 12, 2011

(86) PCT No.: PCT/US2011/051214
§ 371 (c)(1),
(2), (4) Date: Jun. 17, 2013

(87) PCT Pub. No.: WO2013/039473
PCT Pub. Date: Mar. 21, 2013

(65) Prior Publication Data
US 2013/0272676 A1    Oct. 17, 2013

(51) Int. Cl.
*H04N 9/82* (2006.01)
*H04N 9/79* (2006.01)
(Continued)

(52) U.S. Cl.
CPC ............... *H04N 9/79* (2013.01); *G11B 27/105* (2013.01); *H04N 9/8205* (2013.01);
(Continued)

(58) Field of Classification Search
CPC ............ H04N 5/782; H04N 21/47214; H04N 21/4334; H04N 5/76; H04N 5/765
See application file for complete search history.

(56) References Cited

U.S. PATENT DOCUMENTS

| 2002/0012526 A1 | 1/2002 | Sai et al. |
| 2003/0154217 A1 | 8/2003 | Kinno et al. |

(Continued)

FOREIGN PATENT DOCUMENTS

| CN | 103765910 A | 4/2014 |
| JP | 08-287077 A | 11/1996 |

(Continued)

OTHER PUBLICATIONS

"See'N'Search by Samsung" Youtube video retrieved from http://www.youtube.com/watch?v=-0qqaO4fQAw on Sep. 23, 2011; 2 pages.

(Continued)

*Primary Examiner* — William C Vaughn, Jr.
*Assistant Examiner* — Daniel Tekle
(74) *Attorney, Agent, or Firm* — Barre Law Firm, PLLC (57) ABSTRACT

In one example embodiment, a program navigation system involves a television (TV) set (or other audio/visual presentation device) and a mobile device. While the TV set is playing an audio/visual program, a keyword recognition module may extract keywords from textual data associated with the program. The textual data may include textual words that match words spoken in the program. Time markers for the keywords may also be saved. A time marker may indicate a play time within the program for the corresponding keyword. The TV set may automatically transmit the keywords to the mobile device, and the mobile device may automatically display the keywords in a user interface. A user may then select one of the keywords. In response, the mobile device may automatically cause the TV set to jump to a portion of the program containing the selected keyword. Other embodiments are described and claimed.

25 Claims, 5 Drawing Sheets

(51) Int. Cl.
*H04N 21/432* (2011.01)
*H04N 21/8405* (2011.01)
*G11B 27/10* (2006.01)
*H04N 21/422* (2011.01)
*H04N 21/43* (2011.01)
*H04N 21/472* (2011.01)
*H04N 21/488* (2011.01)

(52) U.S. Cl.
CPC ........ *H04N 21/4222* (2013.01); *H04N 21/432* (2013.01); *H04N 21/4307* (2013.01); *H04N 21/4325* (2013.01); *H04N 21/47217* (2013.01); *H04N 21/4884* (2013.01); *H04N 21/8405* (2013.01)

(56) References Cited

U.S. PATENT DOCUMENTS

| | | | |
|---|---|---|---|
| 2007/0154171 | A1 | 7/2007 | Elcock et al. |
| 2007/0174326 | A1 | 7/2007 | Schwartz et al. |
| 2008/0282312 | A1* | 11/2008 | Blinnikka ................ 725/153 |
| 2009/0210905 | A1 | 8/2009 | Maruyama et al. |
| 2010/0146446 | A1 | 6/2010 | Ahn |
| 2010/0146453 | A1 | 6/2010 | Lee |
| 2010/0169930 | A1 | 7/2010 | Ito et al. |
| 2010/0180306 | A1 | 7/2010 | Kim |
| 2010/0229196 | A1 | 9/2010 | Lee |
| 2011/0083151 | A1 | 4/2011 | Kim et al. |
| 2011/0138317 | A1 | 6/2011 | Kang et al. |
| 2011/0219018 | A1 | 9/2011 | Bailey et al. |
| 2011/0262103 | A1* | 10/2011 | Ramachandran et al. .... 386/240 |

FOREIGN PATENT DOCUMENTS

| | | |
|---|---|---|
| JP | 2002-374515 A | 12/2002 |
| JP | 2008-148077 A | 6/2008 |
| JP | 2009-010797 A | 1/2009 |
| JP | 2010-245853 A | 10/2010 |
| JP | 2011-130025 A | 6/2011 |
| JP | 2011-130421 A | 6/2011 |
| KR | 10-2010-0005433 A | 1/2010 |
| KR | 10-2011-0061802 A | 6/2011 |
| KR | 10-2011-0065155 A | 6/2011 |
| TW | 201320725 A1 | 5/2013 |
| WO | 2013/039473 A1 | 3/2013 |

OTHER PUBLICATIONS

Henzinger, Monika et al. "Query-Free News Search" May 20-24, 2003; 8 pages.

Reynolds, Nick. Pulling related web content into a live TV stream, Aug. 25, 2010; 2 pages.

International Search Report Report and Written Opinion received for International Application No. PCT/US2011/051214, mailed on Apr. 27, 2012; 9 pages.

International Preliminary Report on Patentability received for PCT Patent Application No. PCT/US2011/051214, mailed on Mar. 20, 2014, 6 Pages.

Office Action received for Taiwan Patent Application No. 101131543, mailed on Jul. 3, 2015, 2 pages of Taiwan Office Action and 1 page of Search Report only.

Office Action received for Japanese Patent Application No. 2014-529664, mailed on Aug. 25, 2015, 4 pages of English Translation and 3 pages of Japanese Office Action.

European Search Report received for European Patent Application No. 11872358.4, mailed on Feb. 4, 2015, 3 pages.

Office Action received for Korean Patent Application No. 10-2014-7008249, mailed on Apr. 16, 2015, 1 page of partial English Translation and 7 pages of Korean Office Action.

Office Action received for Japanese Patent Application No. 2014-529664, mailed on Apr. 28, 2015, 3 pages of English Translation and 2 pages of Japanese Office Action.

Nikkei BP Inc., Change the 'Galapago' to the source of the strength by products and services made from Japan, 'CEATEC Japan 2010' Full Report, No. 1042, Nov. 1, 2010, pp. 59-76.

Office Action received for Korean Patent Application No. 10-2014-7008249, mailed on Oct. 20, 2015, 1 page of English Translation and 4 pages of Korean Office Action.

Notice of Allowance received for Korean Patent Application No. 10-2014-7008249, mailed on Dec. 22, 2015, 5 pages of English Translation and 2 pages of Notice of Allowance.

Office Action received for European Patent Application No. 11872358.4, mailed on Sep. 16, 2015, 4 pages.

Notice of Allowance received for Taiwan Patent Application No. 101131543, mailed on Feb. 16, 2016, 1 page of English Translation and 2 pages of Taiwan NOA.

* cited by examiner

FIG. 4B

METHODS AND APPARATUS FOR KEYWORD-BASED, NON-LINEAR NAVIGATION OF VIDEO STREAMS AND OTHER CONTENT

TECHNICAL FIELD

The present disclosure relates in general to data processing. More particularly, the present disclosure relates to technology for enabling keyword-based, non-linear navigation of video streams and other content.

BACKGROUND

Movies, television (TV) shows, and other audio/visual (AN) programs can be distributed in a variety of formats. For instance, if a person wants to watch the movie "Casablanca," he or she may be fortunate enough to find the movie being broadcast on an analog or a digital TV channel, over the air or through an electrical or optical cable. Alternatively, the person may buy or rent the movie stored on a magnetic medium such as a video cassette tape, or on an optical medium such as a digital versatile disk (DVD). The movie might also be available for downloading from a remote server to a TV set via a wide area network (WAN) such as the Internet.

In addition, the person (or "viewer") might be particularly interested in a specific portion or segment of the program. For instance, the viewer might want to see the scene in Casablanca where Humphrey Bogart says to Ingrid Bergman "Here's looking at you, kid." However, with any of the program formats discussed above and conventional program playing devices, it can be difficult to find a specific portion of interest within a program.

In particular, linear navigation of the program may be required. For instance, with a video cassette, the viewer may need to play, fast forward, or rewind the tape until he or she finds the portion of interest. With a DVD or a downloaded program, the program may be divided into chapters, and the viewer may use a remote control to jump to a selected chapter of the program. However, the viewer may not know which chapter contains the specific portion of interest, and even if he or she does know which chapter contains the portion of interest, the viewer may still need to play or fast forward through at least some of that chapter before finding the specific portion of interest.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION OF ONE OR MORE EMBODIMENTS

This disclosure describes one or more embodiments of a method for keyword-based, non-linear navigation of video streams and other content. Similarly, this disclosure describes one or more embodiments of a program navigation system that provides for keyword-based, non-linear navigation of video streams and other content. According to one example embodiment, a program navigation system involves a TV set (or other A/V presentation system) and a mobile device. While the TV set is playing an audio/visual program, a keyword recognition module may extract keywords from textual data associated with the program. The textual data may include textual words that match words spoken in the program. Time markers for the keywords may also be saved. A time marker may indicate a play time within the program for the corresponding keyword. The TV set may automatically transmit the keywords to the mobile device, and the mobile device may automatically display the keywords in a user interface. A user may then select one of the keywords. In response, the mobile device may automatically cause the TV set to jump to a portion of the program containing the selected keyword. Other embodiments are described and claimed, including alternative embodiments of program navigation systems, as well as method and program product embodiments.

Traditionally, a person could only navigate through a video program in a linear fashion, by time: playing, fast forwarding, or rewinding. More recent formats (e.g., DVDs) also provide predefined chapters and allow the user to jump to the start of a selected chapter. However, if a person is watching a video program and wishes to move to a point in the program where a specific topic or concept was introduced, it would be difficult to do so, for the reasons stated above. Audio programs typically face similar conditions. For instance, while playing music from a compact disc (CD) on a home stereo, the user may use a remote control to fast forward or rewind within a song, or to jump to the start of the next song, the current song, or the previous song.

TiVo, Inc. provides an application for a tablet that enables the tablet to serve as a remote control for a digital video recorder (DVR). In addition the SYZYGY Group (a graphics design house) has released a video on the Internet with the title "GOAB. A TV EXPERIENCE CONCEPT[:] HOW WILL WE WATCH TV IN THE FUTURE?" That video is available at http:==lab*syzygy*de=en=approach and at http:==vimeo*com=21386019. (However, since it is U.S.P.T.O. policy to avoid inadvertent hyperlinks, periods and forward slashes in those uniform resource locators (URLs) have been replaced with asterisks and equal signs, respectively.) The video starts with the text "What if . . . ." Later on, the video shows what looks like a tablet computer, with screens that include features similar to those provided by a remote control device, by an electronic program guide, by a program selection filter such as the one provided by Netflix, by a retail sales application such as the one provided by Amazon, and by a social interaction application such as Facebook. For instance, the video shows the text "and suits your mood," and then shows a user selecting the attributes "thrilling" and "real" from a cloud of words. The video also shows a screen on the tablet containing a graphic for a hockey game, along with objects such as a small white triangle within a small black circle adjacent to the text "18:19/3RD-SHOT". After the user taps on such an object, the video seems to show a TV playing a part of a hockey match where a player shoots at a goal. Another part of the video seems to show the user viewing, on the tablet, an online catalog entry for a product that previously appeared on the TV. The video also seems to show the user utilizing the tablet (a) to share that catalog entry with other online friends, (b) to receive feedback from those friends, and (c) to purchase the product. However, the video leaves much to the imagination, and for the ideas that are clearly revealed, the video does not say that any of those ideas have actually been implemented by anyone.

In another field, producers of commercial programs such as news broadcasts may use a non-linear editing system that allows assembly of video segments into a completed linear video. However, such editing systems are designed for editors, and not for the general public. Accordingly, such an editing system may involve only a single screen, with no remote control. And though such a system may enable an editor to select and splice together various identified video segments, the editor would still need to scrub through each individual video segment in a linear fashion if he or she wishes to locate a specific phrase or keyword in that video segment. By contrast, at least one embodiment described below involves a TV set and a separate mobile computing device used to control the TV set, based on keywords detected within or associated with an A/V program being played by the TV set.

Applicant is not aware of any conventional systems that give the user an easy way to jump to specific portion of interest within a program, based on a keyword used in that portion of the program.

According to the present disclosure, a non-linear program navigation system allows a secondary device (e.g., a tablet computer, a smartphone, a netbook, etc.) to serve as a navigation device with more intelligence than a conventional remote control. In particular, the disclosed program navigation system allows the user to navigate not just between A/V programs, but within an A/V program, in an intuitive fashion that relates directly to the specific content of interest to the user. For purposes of this disclosure, the terms "audio/visual program" and "A/V program" are used to denote programs that contains audio content, video content, or both audio and video content.

Figure 1:
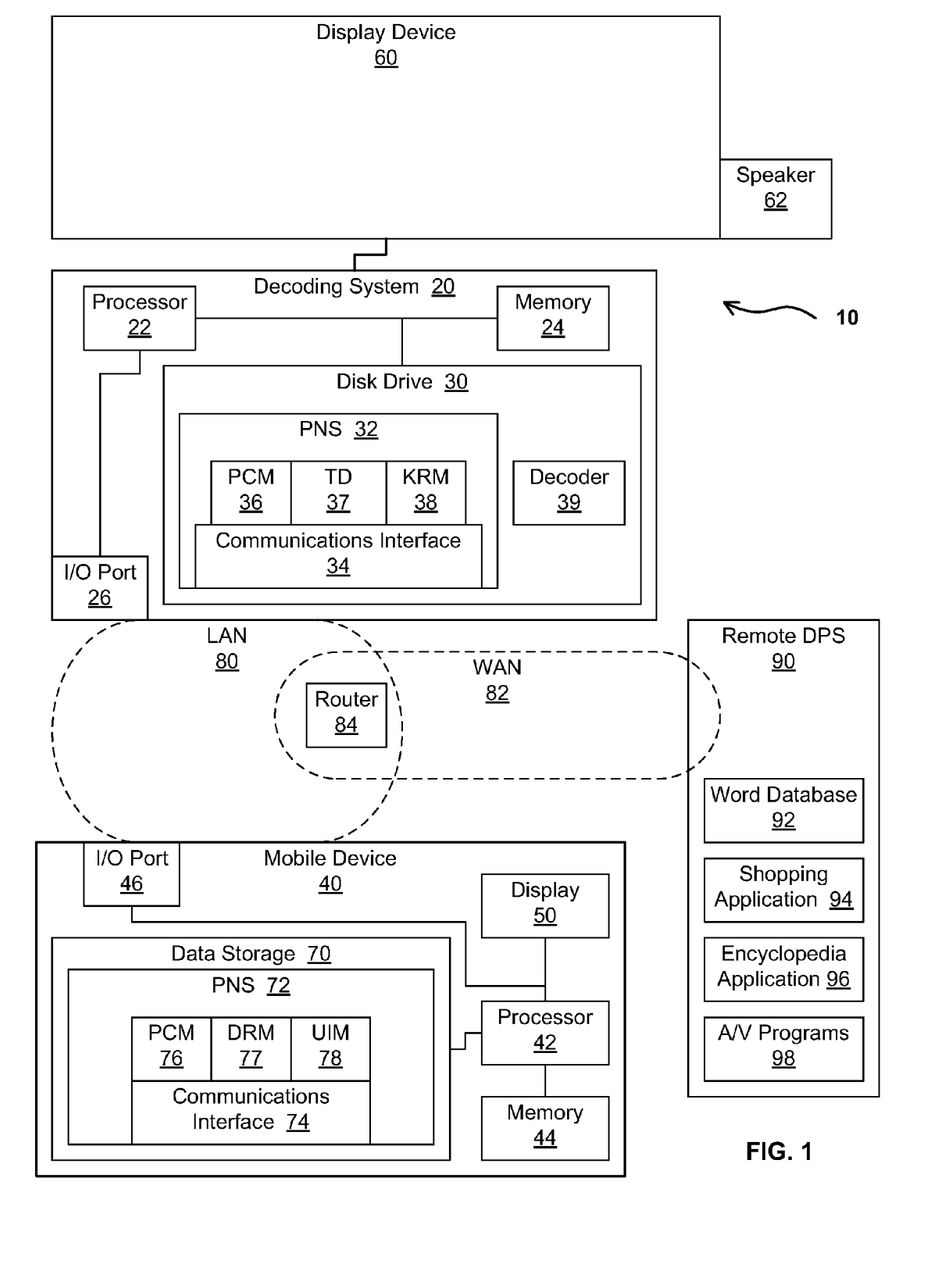
FIG. 1 is a block diagram of an example embodiment of a computing environment featuring an example embodiment of a program navigation system.

FIG. 1 is a block diagram of an example embodiment of a computing environment featuring an example embodiment of a non-linear program navigation system according to the present disclosure. This embodiment includes a TV set 10 and a mobile device 40. As described in greater detail below, mobile device 40 includes a software application referred to herein as a program navigation system 72. TV set 10 includes a different, but corresponding, program navigation system 32. Program navigation systems 32 and 72 may work together to perform the program navigation functions described herein. Accordingly, program navigation systems 32 and 72 may be referred to collectively as a single program navigation system.

In the embodiment of FIG. 1, TV set 10 includes a display device 60 coupled to a decoding system 20. Many different types of decoding systems may be used in many different kinds of embodiments. For instance, suitable decoding systems may include, without limitation, components (e.g., a TV tuner) for decoding A/V signals built in to the same chassis as the display device, TV set top boxes (e.g., cable boxes and digital video recorders (DVRs)), optical disc players, video game consoles, and general purposes computers configured for use in home entertainment centers. Thus, for purposes of this disclosure, terms like "television set" and "TV set" are not limited to devices which feature a display device and a TV tuner enclosed in the same chassis, but includes any audio/visual presentation system that features a display device in communication with a decoding system that is capable of sending video signals to the display device (and/or audio signals to one or more speakers), based on an A/V program stored in or received by the decoding system.

In the embodiment of FIG. 1, decoding system 20 is a data processing system (e.g., a personal computer) with various hardware components necessary or suitable for executing program navigation system 32. Those components, which may be coupled together directly or indirectly, include at least one processor 22, random access memory (RAM) 24, various network or input/output (I/O) ports 26, and at least one non-volatile storage device (e.g., a disk drive 30). The I/O ports may include (a) wired and/or wireless network interfaces, (b) short range wireless interfaces using technologies such as infrared or Bluetooth, (c) A/V interfaces (e.g., a cable TV port or an analog or digital TV antenna port), and (d) any other suitable communications interfaces.

Program navigation system 32 may reside on disk drive 30, and decoding system 20 may copy some or all of program navigation system 32 into memory 24 and execute program navigation system 32 on processor 22. Program navigation system 32 is described in greater detail below.

Decoding system 20 may also execute a decoder 38 to convert an encoded version of an A/V program into video and audio streams to be displayed on display device 60 and played through one or more speakers 62. For example, the Moving Picture Experts Group (MPEG) has developed a popular standard for the generic coding of moving pictures and associated audio information, and that standard is known as MPEG-2. Decoding system 20 may use decoder 39 to decode a program (e.g., a movie) that has been delivered (or is being delivered) to TV set 10 in the MPEG-2 format. In some embodiments, different kinds of decoders, executed by processor 22 or operating relatively independently from processor 22, may be used to decode programs using the MPEG-2 format or other formats.

FIG. 1 also depicts various resources or components within mobile device 40 for executing program navigation system 72. In one embodiment, mobile device 40 is a tablet computer with components that may be coupled together directly or indirectly, including at least one processor 42, RAM 44, various network or input/output (I/O) ports 46, at least one non-volatile storage device 70 (e.g., a disk drive, flash memory, etc.), and a display device 50. In one embodiment, display device 50 is a touch screen and also serves as an input device. Other types of displays and input devices may be used in other embodiments.

The I/O ports for decoding system 20 and mobile device 40 may include wired and/or wireless network interfaces, short range wireless interfaces using technologies such as infrared or Bluetooth, and/or any other suitable communications interfaces. For instance, As described in greater detail below, mobile device 40 and TV set 10 may communicate with each other over a local area network (LAN) provided by one or more wireless routers 84. Alternatively, mobile device 40 or any of the other devices may use cellular technology to communicate with the Internet and/or with each other. In other embodiments, infrared communications, Bluetooth communications, broadband communications including but not limited to WiFi and WiMax, and any other suitable communication technology or combination of communication technologies may be used.

In some alternative embodiments, smartphones may be used as mobile device for the program navigation system. In other embodiments, the mobile devices may serve primarily remote controls for controlling the associated TV sets according to the teachings described herein. In other embodiments, other types of processing systems may serve as the mobile device. In the embodiment of FIG. 1, program navigation system 72 includes a user interface module 78 for presenting information and options to the user and receiving input from the user.

Figure 2:
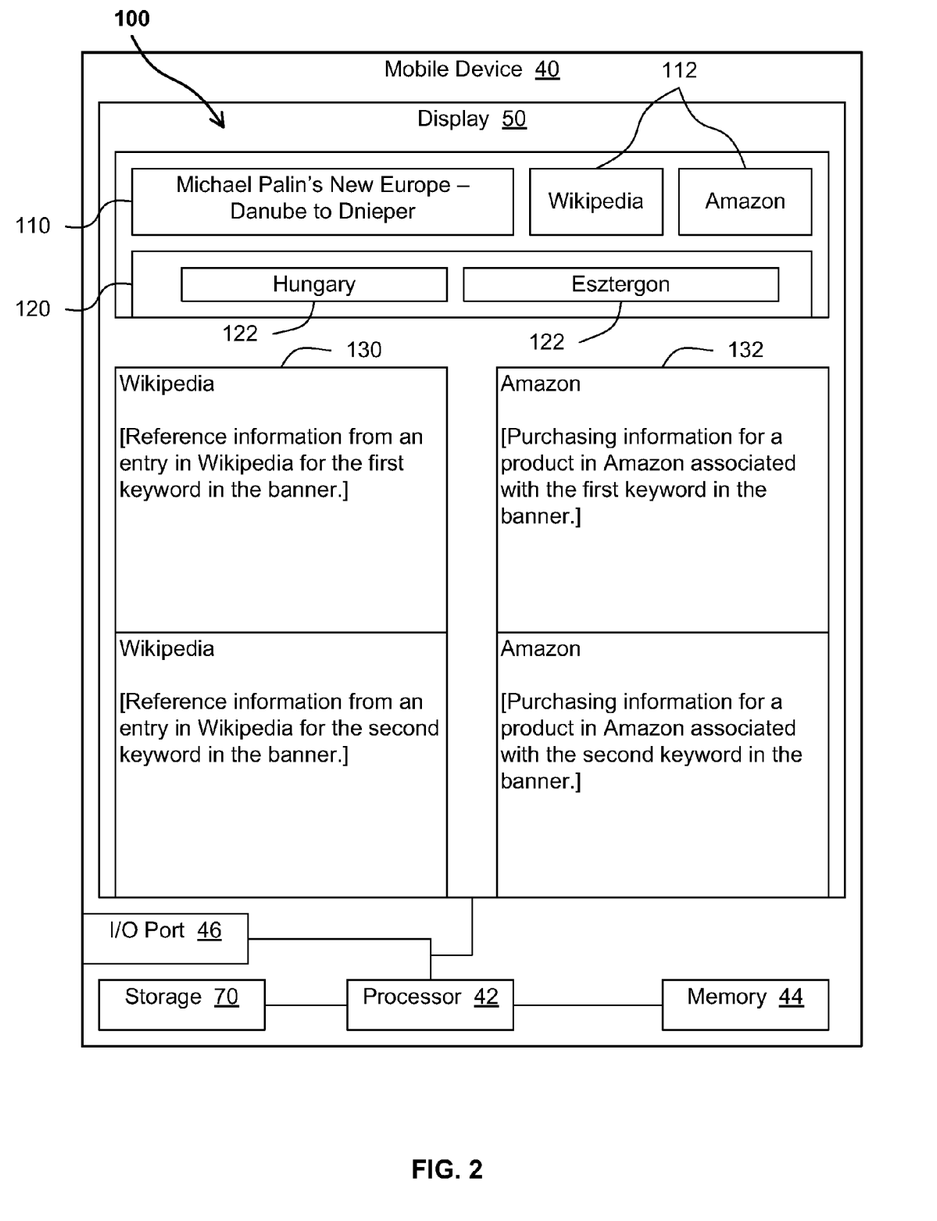
FIG. 2 is a schematic diagram of an example embodiment of a user interface on a mobile device for a program navigation system.

FIG. 2 is a schematic diagram of an example embodiment of a user interface 100 presented by user interface module 78 of mobile device 40. User interface 100 may include various objects to help the user navigate to a particular portion of interest within an A/V program. Those objects may include a title box 110 displaying the title of the program currently being played by TV set 10, possibly along with other general information about the program. Program navigation system 72 may obtain this information from electronic program guide (EPG) data for the program, and/or from any other suitable source. Program navigation system 32 may extract this kind of information from the A/V program, and may then send this information to program navigation system 72 when TV set 10 first begins playing the program, for instance.

User interface 100 may also include a scrolling banner 120, within which keywords 122 from the program appear. By selecting a keyword from the banner, the user may cause TV set 10 to jump to the portion of the program at which the keyword appears. Additional details concerning the use of user interface 100 are provided below, with regard to FIG. 3.

Also, for purposes of this disclosure, when the TV set is described as jumping or shifting to a specific part of the program, or when similar phrases are used, those phrases mean the TV set jumps to a different play time within the program, with regard to which content is being presented by the TV set. In other words, when the TV set jumps or shifts to a new playtime, the physical location of the TV in the room typically does not change, but the part of the program being played by the TV changes.

Referring again to FIG. 1, additional data processing systems may also cooperate with TV set 10 and mobile device 40 to provide the functionality described herein. For instance, TV set 10 may download movies or other A/V programs from a collection or database of A/V programs 98 on a remote data processing system 90. TV set 10 may also download various collections of important words from a word database 92 in remote system 90. As described in greater detail below, program navigation system 32 may use one or more collections of important words when deciding which textual words for an A/V program should be identified as keywords. Also, as described in greater detail below, mobile device 40 may obtain information from a shopping application 94, from an encyclopedia application 96, and/or from other sources of information on remote system 90. In other embodiments, multiple remote systems may be used. For example, each remote system could provide a different type of information. TV set 10 and mobile device 40 may communicate with remote systems via a wide area network (WAN) 82 (e.g., the Internet). Remote data processing system 90 may include similar components as mobile device 40, including without limitation one or more processors, memory, a disk drive and/or other nonvolatile storage devices, and software stored in the storage devices. In some embodiments, some or all of the information and/or components that Figure shows in remote system 90 may alternatively be stored, in whole or in part, in mobile device 40 and/or in TV set 10.

Within TV set 10, program navigation system 32 includes a communication interface 34. Similarly, program navigation system 72 in mobile device 40 includes a communication interface 74. Program navigation system 32 uses communication interface 34 to transmit keywords to mobile device 40 while TV set 10 is playing a program. Mobile device 40 uses communication interface 74 to receive the keywords from TV set 10, and to transmit program control commands to TV set 10. In one embodiment, these communication interfaces are based on the Extensible Messaging and Presence Protocol (XMPP) standard, and they allow program navigation systems 32 and 72 to communicate with each other. For instance, TV set 10 and mobile device 40 may use communication interfaces 34 and 74 to register into an XMPP server which provides for two way communication between those registered applications. Furthermore, the program navigation system in general may allow for communication between the TV set and multiple mobile devices. In that case, messages sent from the TV set may be broadcast to all of the registered mobile devices. Any suitable processing system may be used as the XMPP server, including decoding system 20, mobile device 40, or another data processing system.

Figure 3:
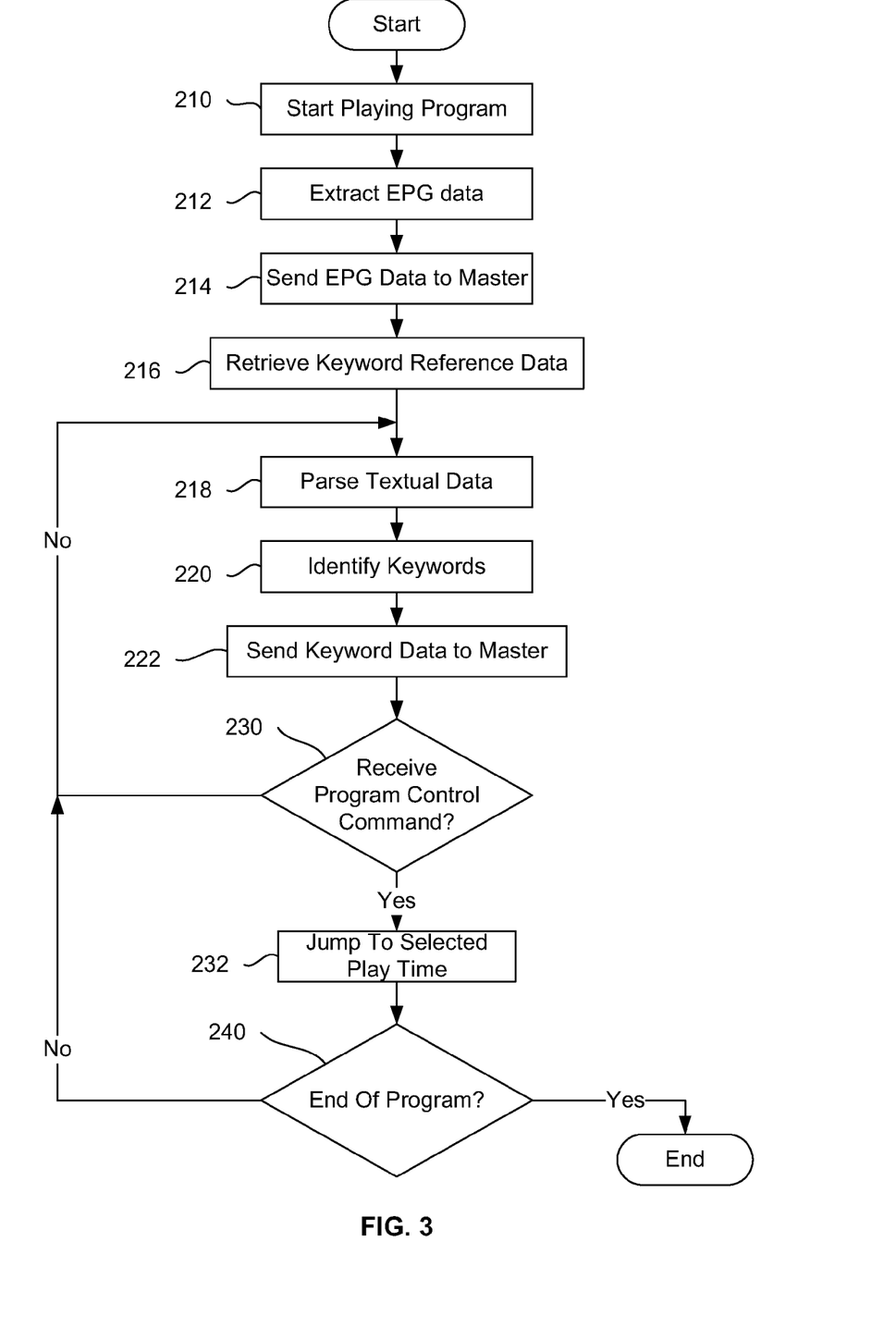
FIG. 3 is a flowchart depicting an example embodiment of a process for providing program navigation services, more or less from the perspective of a TV set.

FIG. 3 is a flowchart depicting an example embodiment of a process for providing program navigation services, more or less from the perspective of TV set 10. That process may begin when TV set 10 starts playing an A/V program, as indicated at block 210. As described above, the program navigation system may support A/V programs with many different kinds of formats, including without limitation broadcast TV, streaming programs, programs stored on magnetic or optical media, etc. In at least one embodiment, if TV set 10 does not already have some or all of the program stored on a machine accessible medium, TV set 10 may save some or all of the program as the program is being played, to facilitate keyword-based navigation. Also, as indicated at block 212, when TV set 10 starts playing the program, program navigation system 32 may then extract or capture EPG data from the program. For purposes of this disclosure, the term "EPG data" refers to general information about a program, including without limitation the following items:

Program Channel (e.g., PBS),
Show Title (e.g., Michael Palin's New Europe),
Episode Title (e.g., Danube to Dnieper),
Genre (e.g., Travel)
Synopsis (e.g., Michael visits Hungary, the Ukraine, the Black Sea, Yalta, Budapest's "House of Terror," a National Park in Hortobagy, areas conquered by Attila the Hun, and Leeds. He also visits a market trader who married the Ukranian prime minister.)

Also, EPG data may be obtained from an EPG channel, from within the A/V program itself, or from other sources.

Referring again to FIG. 1, in one embodiment, program navigation system 32 includes a text daemon 37 that automatically captures textual data from a program as the program is being played, along with corresponding play time information. In one embodiment, text daemon 37 is written in Javascript and implemented as plug-in that operates in the video/audio stack relative to an operating system (OS) on decoding system 20. In alternative embodiments other types of implementations, including without limitation Java and C/C++, may be used for the text daemon.

The operation of capturing EPG data at block 212 may be perform by text daemon 37 or by another part of program navigation system 32. Since TV set 10 follows program navigation commands from mobile device 40, mobile device 40 may be referred to as the master, and TV set 10 may be referred to as the slave. Accordingly, as shown at block 214, after the slave has extracted the EPG data, program navigation system 32 may send the extracted EPG data to the master, via communications interfaces 34 and 74.

As shown at block 216, program navigation system 32 may then retrieve keyword reference data (e.g., from important word database 92) to be used in determining which words from the program should be considered keywords.

As shown at block 216, text daemon 37 may then start automatically parsing textual data from the program to capture a textual version of each spoken word from the audio portion of the program, along with a time stamp or time marker for each of those words. In the case of broadcast signals, for instance, text daemon 37 may extract the textual data from a closed caption text feed for the program, as that feed is dynamically received by TV set 10. Typically, a closed caption text feed includes a transcription of the audio portion of a program, with that text feed being supplied in synchronization with the audio and video portions of the program.

In the case of Internet protocol TV (IPTV) using version 5 of the hypertext markup language (HTML5), TV set 10 may receive programs containing textual annotations, and text daemon 37 may extract the words from those annotations, while capturing the corresponding program play times. For other formats (e.g., movies on DVD or Blu-ray, locally stored or streaming movies, etc), the text daemon may use other techniques to obtain (a) the textual data that corresponds to the spoken words in the audio for the program and (b) the associated play times for those words.

As suggested above, while extracting the textual data, text daemon 37 may also save a time marker that identifies the play time within the program for each word or phrase in the textual data. This time marker may be referred to as a "video timecode" for the word, a "play time" for the word, or an "in-point" for the word. In other words, text daemon 37 may capture each word from the closed caption text feed, along with the corresponding program play time for the beginning of each of those words. In one embodiment, time attributes such as the play times, the time markers, the in-times, etc., all follow the Society of Motion Picture and Television Engineers (SMPTE) format of HH:MM:SS:FF, where HH:MM:SS measures the time of the recording (the "realtime") or the amount of time from the beginning of the program (the "tape-time"), and FF identifies the number of the current frame within the second. In other embodiments, different formats may be used for one or more of the time attributes.

In addition, as shown at block 220, while text daemon 37 is parsing the textual data from the program and saving corresponding time markers, a keyword recognition module 38 may automatically determine which of the parsed words should be treated as keywords. In one embodiment, keyword recognition module 38 is implemented as part of program navigation system 32.

Keyword recognition module 38 may use any suitable technique or combination of techniques to identify the keywords. Some techniques may involve searching, indexing, and otherwise analyzing the program's textual data to find certain type of words or phrases to be considered keywords. For instance, keyword recognition module 38 may identify a word or phrase as a keyword if that word or phrase is used more than a certain number of times. As another example, words that appear both in the textual data and in the EPG may be considered keywords. As another example, keyword recognition module 38 may search the program's textual data for proper nouns, treating all proper nouns as keywords. However, with keyword recognition module 38, when two or more proper nouns appear in sequence or separated only by prepositions, those words may be chained or combined to form a single keyword (e.g., World War II, Peace of Westphalia). In one embodiment, keyword recognition module 38 analyzes the program's textual data to identify different parts of speech, including noun phrases. In another embodiment, keyword recognition module 38 analyzes capitalization of words in the textual data to identify proper nouns. Any combination of these and other techniques may be used to identify proper nouns in other embodiments.

Some techniques for identifying keywords may involve cross referencing the program's textual data with one or more existing database of important terms, such as word database 92 of FIG. 1. Such databases may include, without limitation, lists of places, lists of famous names, and tables of content and/or indexes from books. Different databases may also be focused on different topics or genres. For instance, one database may include names of athletes and important sports terms, while another database includes important business terms.

Any combination of the above techniques and/or other techniques may be used in different embodiments.

As shown at block 222, as program navigation system 32 identifies each keyword, it may send that keyword and the corresponding time marker to the master. The keywords and corresponding time markers may be referred to collectively as "keyword data." Program navigation system 32 may then determine whether it has received a program control command from the master, as shown at block 230. If no such command has been received, the process may return to block 218, with text daemon 37 continuing to parse the textual data and save the corresponding time markers, etc., as described above.

However, when program navigation system 32 receives a program control command from program navigation system 72, a program control module 36 in program navigation system causes TV set 10 to jump from the current position in the program to the position specified in the program control command, as indicated at block 232. For instance, when a user utilizes mobile device 40 to select a particular keyword of interest to the user, program control module 36 responds to the resulting program control command by causing TV set 10 to jump to the play time of the program where the selected keyword was used. For instance, if the user selects the keyword 122 for "Hungary," TV set 10 may jump back to the video in-time associated with the first utilization of the word "Hungary" in the A/V program. And if the user then selects the keyword 122 for "Esztergon," TV set 10 may jump forward to the video in-time associated with the first utilization of the word "Esztergon" in the A/V program.

As shown at block 240, program navigation system 32 may then determine whether the end of the program has been reached. If so, the process may end. Otherwise, the process may return to block 218, with processing to continue as described above.

Figure 4A:
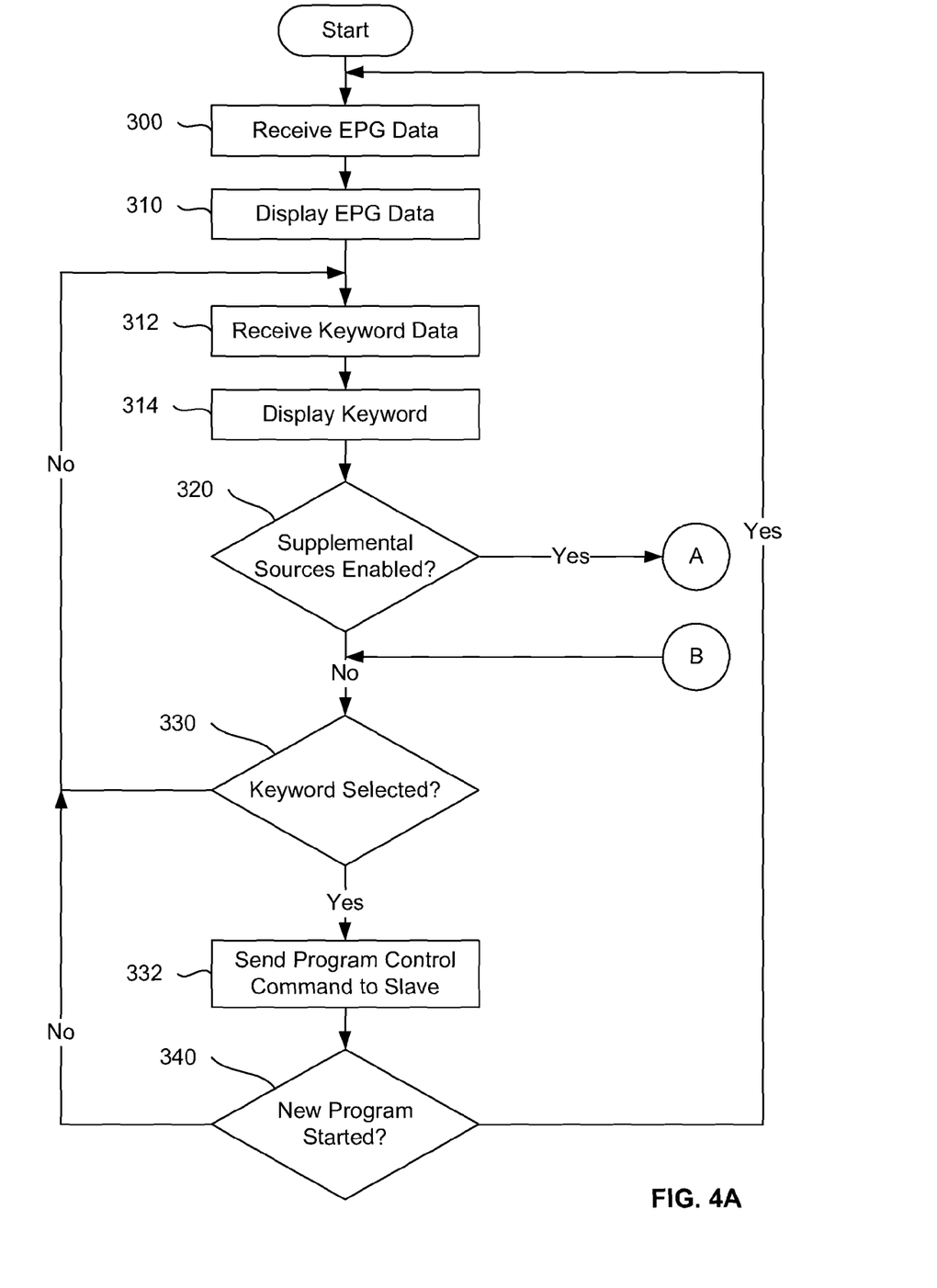
FIGS. 4A & 4B present a flowchart of an example embodiment of a process for providing program navigation services, more or less from the perspective of a mobile device.
Figure 4B:
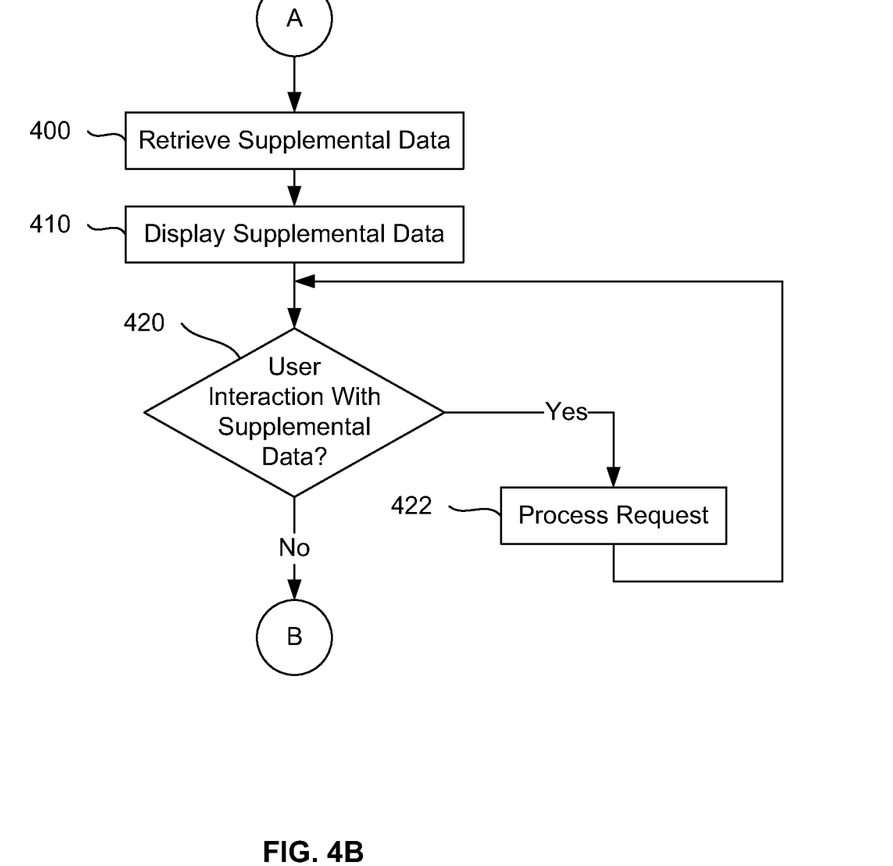

FIGS. 4A & 4B present a flowchart of an example embodiment of a process for providing program navigation services, more or less from the perspective of mobile device 40. As shown at block 300, that process may begin with program navigation system 72 receiving EPG data from program navigation system 32. User interface module 78 may then display some or all of the EPG data in title box 110 of user interface 100, as indicated at block 310 and illustrated in FIG. 2. As shown at block 312, program navigation system 72 may also receive keyword data from program navigation system 32 in real time, as the program is being shown on TV set 10 and program navigation system 32 is identifying the keywords. And as indicated at block 314 and illustrated in FIG. 2, user interface module 78 may add each new keyword 122 to banner 120, possibly scrolling older keywords off of the screen, as necessary to make room for the newer keywords. However, user interface module 78 may allow the user to adjust which keywords appear on the screen, for instance by recognizing a flick from the user in the banner area, and in response, scrolling the keywords in the direction of the flick.

Furthermore, user interface module 78 may provide various other navigation mechanisms, based on the nature of the keyword and its mapping to a time marker and/or based on user-specified settings. For instance, if multiple occurrences of the same keyword have been found, user interface module 78 may display a single button (or other object) for that keyword, along with an indication of how many occurrences have been found. The user may then select the keyword once to jump to the first occurrence of the keyword in the program, and repeatedly to progress consecutively through the different segments of the program where the same keyword is used. For instance, if TV set 10 is playing the Bob Newhart Show, keyword recognition module 38 may determine that "Bob" is a keyword, and the user may repeatedly select "Bob" in user interface 100 to see each portion of the show where the word "Bob" has been spoken.

For another option, user interface module may be set to automatically jump to the most recent occurrence of the keyword, or to provide the user with an option to jump to the most recent occurrence. For another option, user interface module 78 may present the occurrences in a list format, allowing the user to select any occurrence of the keyword to jump to. User interface module 78 may also provide some context from the program to help the user understand where each keyword in the list is situated within the program. For example, program navigation system 32 may send a snapshot of the video track from the time of each keyword to program navigation system 72, and user interface module 78 may display those snapshots along with the keywords. For another option, program navigation system 32 may send some adjacent text from the textual data to program navigation system 72, and user interface module 78 may display that text along with the keywords. For another option, program navigation system 32 may send an audio clip containing the keyword to program navigation system 72, and user interface module 78 may play that audio when the user interacts with that keyword.

For another option, user interface module may be set to automatically jump to the most important occurrence of the keyword, or to provide the user with an option to jump to the most important occurrence. Any suitable technique may be used to rank the importance of the different keywords. For instance, program navigation system 32 may determine that a keyword is most important based on a determination that that keyword occurs in a segment of the textual data that has the most textual overlap with previous segments of the textual data.

In other embodiments, other approaches may be used to display the keywords. For instance, user interface module 78 may categorize keywords into different topics, with each topic linked to two or more keywords. For another option, user interface module 78 may be configured to display the keywords as a tag cloud.

As shown at block 320, program navigation system 72 may also determine whether any supplemental information sources have been enabled. For instance, user interface 100 may include enabling buttons 112 (or other types of objects) that the user can operate to enable or disable particular sources of supplemental information. In the embodiment of FIG. 2, enabling buttons 112 can be used to enable or disable an online encyclopedia (e.g., Wikipedia) and an online vendor (e.g., Amazon). If any supplemental information sources have been enabled, the process may pass through page connector A to FIG. 4B, with a data retrieval module 77 of program navigation system 72 using the latest keyword to retrieve information from each of the enabled sources, as shown at block 400. User interface module 78 may then display some or all of the retrieved information in user interface 100, as shown at block 410, with information for a newer keyword possibly displacing information for an older keyword. For instance, in FIG. 2, user interface 100 shows two keywords 122, along with two columns of supplemental information. The first column 130 includes information from the first supplemental source (e.g., Wikipedia), with a box containing information that pertains to the newest keyword in banner 120 (e.g., Esztergon) appearing above a box that contains information that pertains to the previous keyword (e.g., Hungary). The second column 132 includes information from the second supplemental source (e.g., Amazon), with different boxes in that column displaying information for different keywords, as described above. User interface module 78 may also allow the user to manipulate the columns to adjust which boxes are shown, for instance by responding to flicks from the user or to any other suitable user input technique.

As indicated at blocks 420 and 422 of FIG. 4B, user interface module also allows additional interactions by the user with the supplemental information. For instance, if column 132 shows a book about Hungary for sale by Amazon, user interface module 78 may allow the user to purchase the book. And if column 130 shows a Wikipedia entry about Hungary, user interface module 78 may allow the user to jump from that Wikipedia entry to a different web page by selecting a hyperlink within that Wikipedia entry.

As shown at block 420, if user interface module 78 detects no user interaction with the supplemental data, the process may return to FIG. 4A via page connector B.

User interface module 78 may then determine whether the user has selected one of the displayed keywords, as shown at block 330. If no keyword has been selected, the process may return to block 312. But if the user has selected a keyword, program control module 76 may send a program control command to TV set 10, instructing TV set 10 to jump to the part of the program that contains the selected keyword, as indicated at block 332. For instance, the program control command may contain the time marker for the selected keyword. The program control command may thus cause TV set 10 to "scrub" the video to the in-point identified by the selected keyword with its video time marker.

In another embodiment, the time stamps are stored in TV set 10 and need not be sent with the program control command. Instead, the program control command may identify the selected keywords, or the instance of the selected keyword, and the program control module in the TV set can use that information to determine the proper in-time. In any case, the program navigation system allows the user to easily navigate to the precise frame at which a keyword was introduced. This entry point can be preset by the user to be exact or configured to be any number of seconds before the keyword instance.

As shown at block 340, program navigation system 72 may then determine whether TV set 10 has started playing a new A/V program. If a new program has been started, the process may return to block 300, with program navigation system receiving EPG data for the new program, etc. If no new program has started, the process may return to block 312, with program navigation system continuing to receive new keywords for the existing program from program navigation system 32, etc.

As has been described, a program navigation system according to the present disclosure captures keywords from an A/V program and allows the end user to utilize these keywords to navigate directly to a specific portion of interest in the program. The program navigation system may enable the end user to easily maneuver back and forth through the video stream and locate segments of interest by simply clicking on the captured keywords.

For programs that are recorded by TV set 10 (e.g., with a DVR), the program navigation system may generate keywords and time stamps that are unique to that particular recording, due to specific attributes of that recording, such as the precise start time and end time of the recording, the content of the commercials or part of other programs (e.g., a pre-game sports show and/or post-game commentary) that were recorded with the program, etc.

Furthermore, TV set 10 and/or mobile device 40 may save the keyword data (including the list of identified keywords and the corresponding time markers) for a program (e.g., on the DVR). When the program is subsequently played, the program navigation system may use the saved keyword data to enable the user to jump directly (forward or backward) to the segment of any desired keyword. In addition, the saved keyword data may be sent to a device of another user, to enable the other user to utilize keyword-based navigation while watching the same program.

In addition to use in the general consumer market, the program navigation system can be used, for example, in training and education markets. For example, a student could use the program navigation system to watch a training video, and the resulting keywords would allow the student to more easily find interesting video segments (e.g., for purposes of reviewing portions of the program pertaining to certain topics of interest).

The present teachings could also be used with other types of programs with textual data that matches the content being presented. For example, the program navigation system could be used to play an audio program (e.g., a song or a collection of songs) through speakers, and the program navigation system could extract keywords from a transcript of the lyrics. Alternatively, the program navigation system could be used to display an electronic book ("ebook"), and the program navigation system could extract keywords from the ebook, for use in navigating the ebook.

In addition, terms from a video may be captured and highlighted in an ebook. For instance, medical students may use mobile devices to view an electronic anatomy book while watching a surgeon perform an operation. The surgeon may narrate the operation while performing it, and the narration may be concurrently transcribed. The program navigation system may automatically recognize keywords from the transcript, with those keywords also appearing on the mobile devices. A student could then click on a keyword to jump to a corresponding portion of the anatomy book. For instance, if the surgeon says "kidney," the program navigation system may recognize that word as a keyword, and when a student clicks on that keyword, that student's mobile device may jump to a chapter on kidneys in the anatomy book. Further, in one embodiment, the mobile device may be configured to automatically jump to a corresponding chapter or page of the ebook as each new keyword comes up.

In addition, one mobile device may be configured to control other mobile devices. For instance, in a group of student with a class leader, when the class leader clicks on a keyword on his or her mobile device, all of the mobile devices may jump to the corresponding section of the ebook.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Also, components or devices that are described as being in communication with each other or as being responsive to each other need not be in continuous communication with each other, unless expressly specified otherwise. In addition, devices that are described as being coupled or in communication with each other or as being responsive to one another may communicate or be coupled either directly or indirectly through one or more intermediaries.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), flash memory, etc. Alternatively, some or all of the control logic for implementing the described operations may be implemented in hardware logic (e.g., as part of an integrated circuit chip, a programmable gate array (PGA), an application specific integrated circuit (ASIC), etc.). Instructions may also be used in a distributed environment, and may be stored locally and/or remotely for access by single or multi-processor machines.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims and all equivalents to such implementations.

What is claimed is:

1. A method for audio and visual program navigation, the method comprising:
 at a mobile computing device, wirelessly receiving, from an audio and visual presentation system, a stream of keyword data for an audio and visual program currently being played by the audio and visual presentation system, wherein the stream of keyword data comprises textual keywords that match spoken words from audio content of the audio and visual program;
 at the mobile computing device, automatically displaying two or more of the keywords from the audio and visual presentation system in a user interface;

at the mobile computing device, receiving user input indicating that a user has selected one of the displayed keywords; and in response to receiving the user input at the mobile computing device, automatically causing the audio and visual presentation system to jump to a portion of the audio and visual program that contains the selected keyword.

2. A method according to claim 1, wherein the keyword data comprises keywords extracted from closed caption data for the audio and visual program by the audio and visual presentation system.

3. A method according to claim 1, wherein the audio and visual presentation system comprises a display device in communication with at least one decoding device from the group consisting of:
 a television tuner;
 an optical disc player; and
 a digital video recorder.

4. A method according to claim 1, wherein:
the keyword data further comprises time markers associated with corresponding keywords; and
the operation of automatically causing the audio and visual presentation system to jump to the portion of the audio and visual program that contains the selected keyword comprises:
 generating a program control command instructing the audio and visual presentation system to jump to the selected portion of the audio and visual program, based on the selected keyword and the corresponding time marker; and
 sending the program control command to the audio and visual presentation system via a wireless communications interface.

5. A method according to claim 1, further comprising:
establishing a wireless communication channel between the mobile computing device and the audio and visual presentation system;
using the wireless communication channel to receive the keyword data for the audio and visual program from the audio and visual presentation system; and
using the wireless communication channel to cause the audio and visual presentation system to jump to the portion of the audio and visual program that contains the selected keyword.

6. A method according to claim 1, wherein:
the operation of automatically displaying two or more of the keywords in the user interface comprises scrolling new keywords onto the user interface and scrolling old keywords off of the user interface as the mobile computing device receives new keywords from the audio and visual presentation system; and
in response to user input, scrolling old keywords back onto the user interface, to allow the user to utilize one of the old keywords to select a corresponding portion of the audio and visual program to be played by the audio and visual presentation system.

7. A method according to claim 1, further comprising:
after receiving at least one keyword for the audio and visual program from the audio and visual presentation system:
 at the mobile computing device, automatically retrieving, from a public wide area network, information relating to the at least one keyword; and
 at the mobile computing device, automatically displaying at least some of the information from the public wide area network relating to the at least one keyword.

8. A method according to claim 7, wherein:
the operation of automatically retrieving information relating to the at least one keyword comprises:
 automatically retrieving reference information about a meaning of the at least one keyword from an online encyclopedia; and
 automatically retrieving purchasing information about products pertaining to the at least one keyword from a website of a vendor who offers said products for sale over the public wide area network; and
the operation of automatically displaying at least some of the information from the public wide area network relating to at least one of the keywords comprises simultaneously displaying at least some of the reference information and at least some of the purchasing information at the mobile computing device.

9. A method according to claim 8, further comprising:
receiving user input requesting deactivation of a particular source of information on the public wide area network; and
automatically retrieving information only from sources of information on the public wide area network for which deactivation has not been requested.

10. An article of manufacture comprising:
a tangible machine accessible medium; and
instructions in the machine accessible medium which, when executed by a mobile device, enable the mobile device to perform operations comprising:
 wirelessly receiving, from an audio and visual presentation system, a stream of keyword data for an audio and visual program currently being played by the audio and visual presentation system, wherein the stream of keyword data comprises textual keywords that match spoken words from audio content of the audio and visual program;
 automatically displaying two or more of the keywords from the audio and visual presentation system in a user interface;
 receiving user input indicating that a user has selected one of the displayed keywords; and
 in response to receiving the user input, automatically causing the audio and visual presentation system to jump to a portion of the audio and visual program that contains the selected keyword.

11. An article of manufacture according to claim 10, wherein:
the keyword data further comprises time markers associated with corresponding keywords; and
the operation of automatically causing the audio and visual presentation system to jump to the portion of the audio and visual program that contains the selected keyword comprises:
 generating a program control command instructing the audio and visual presentation system to jump to the selected portion of the audio and visual program, based on the selected keyword and the corresponding time marker; and
 sending the program control command to the audio and visual presentation system via a wireless communications interface.

12. An article of manufacture according to claim 10, wherein the instructions enable the mobile device to perform further operations comprising:
establishing a wireless communication channel between the mobile computing device and the audio and visual presentation system;

using the wireless communication channel to receive the keyword data for the audio and visual program from the audio and visual presentation system; and using the wireless communication channel to cause the audio and visual presentation system to jump to the portion of the audio and visual program that contains the selected keyword.

13. An article of manufacture according to claim 10, wherein:

the operation of automatically displaying two or more of the keywords in the user interface comprises scrolling new keywords onto the user interface and scrolling old keywords off of the user interface as the mobile computing device receives new keywords from the audio and visual presentation system; and in response to user input, scrolling old keywords back onto the user interface, to allow the user to utilize one of the old keywords to select a corresponding portion of the audio and visual program to be played by the audio and visual presentation system.

14. An article of manufacture according to claim 10, wherein the instructions enable the mobile device to perform further operations comprising:

after receiving at least one keyword for the audio and visual program from the audio and visual presentation system:
automatically retrieving, from a public wide area network, information relating to the at least one keyword; and
automatically displaying at least some of the information from the public wide area network relating to the at least one keyword.

15. An article of manufacture according to claim 14, wherein:

the operation of automatically retrieving information relating to the at least one keyword comprises:
automatically retrieving reference information about a meaning of the at least one keyword from an online encyclopedia; and
automatically retrieving purchasing information about products pertaining to the at least one keyword from a website of a vendor who offers said products for sale over the public wide area network; and the operation of automatically displaying at least some of the information from the public wide area network relating to at least one of the keywords comprises simultaneously displaying at least some of the reference information and at least some of the purchasing information at the mobile computing device.

16. A mobile computing device comprising:

a wireless communications interface operable to receive, from an audio and visual presentation system, a stream of keyword data for an audio and visual program currently being played by the audio and visual presentation system, wherein the stream of keyword data comprises textual keywords that match spoken words from audio content of the audio and visual program;

a user interface module configured to automatically display two or more of the keywords in a user interface, and to receive user input indicating that a user has selected one of the keywords; and a program control module configured to automatically cause the audio and visual presentation system to jump to a portion of the audio and visual program that contains the selected keyword, in response to the user input selecting the keyword.

17. A mobile computing device according to claim 16, wherein the keyword data comprises keywords extracted from closed caption data for the audio and visual program by the audio and visual presentation system.

18. A mobile computing device according to claim 16, wherein:

the keyword data further comprises time markers associated with corresponding keywords; and the program control module is further configured to perform operations comprising:
generating a program control command instructing the audio and visual presentation system to jump to a selected portion of the audio and visual program, based on the selected keyword and the corresponding time marker; and
sending the program control command to the audio and visual presentation system via the wireless communications interface.

19. An audio and visual presentation device comprising:

a display device;

a decoder in communication with the display device, the decoder configured to display video content of an audio and visual program on the display device;

a keyword recognition module configured to automatically identify keywords from within textual data received by the audio and visual presentation device for the audio and visual program while the audio and visual presentation device is playing the audio and visual program, wherein the keywords comprises textual words that match spoken words from audio content of the audio and visual program;

a wireless communications interface operable to perform operations comprising:
while the audio and visual presentation device is playing the audio and visual program, sending, to a mobile device, a stream of keyword data for the audio and visual program, wherein the stream of keyword data comprises at least some of the keywords identified by the keyword recognition module; and
after sending at least some keyword data for the audio and visual program to the mobile device, receiving, from the mobile device, a program control command pertaining to a keyword selected by a user of the mobile device from the stream of keyword data sent to the mobile device; and a program control module configured to automatically cause the audio and visual presentation device to shift the audio and visual program from a current play time of the audio and visual program to a different play time of the audio and visual program, based on the program control command from the mobile device.

20. An audio and visual presentation device according to claim 19, wherein the decoder comprises at least one component from the group consisting of:
a television tuner;
an optical disc player; and
a digital video recorder.

21. An audio and visual presentation device according to claim 19, wherein the decoder comprises at least one component from the group consisting of:
a television tuner;
an optical disc player;
a digital video recorder; and
a decoder application to execute on a microprocessor in the audio and visual presentation device.

22. An audio and visual presentation device according to claim 19, wherein the keyword recognition module is operable to automatically identify keywords by performing operations comprising:

automatically cross referencing the textual data received by the audio and visual presentation device for the audio and visual program with an existing database of important terms; and automatically identifying as keywords words that appear both in the textual data for the audio and visual program and in the database of important terms.

23. An audio and visual presentation device according to claim 19, wherein the keyword recognition module is operable to automatically identify keywords by performing operations comprising:

automatically determining which words within the textual data are proper nouns; and automatically identifying at least some of said proper nouns as keywords.

24. An audio and visual presentation device according to claim 19, wherein:

the program control command from the mobile device specifies a play time for the keyword selected by the user; and the program control module is operable to automatically cause the audio and visual presentation device to jump from the current play time of the audio and visual program to the play time specified by the program control command.

25. An audio and visual presentation device according to claim 19, further comprising at least one item from the group consisting of:

a network interface operable to receive an encoded version of the audio and visual program from an external source; and a storage medium in communication with the decoder, the storage medium operable to store at least part of the encoded version of the audio and visual program.

\* \* \* \* \*